(12) United States Patent
Kornecki et al.

(10) Patent No.: US 10,959,363 B2
(45) Date of Patent: Mar. 30, 2021

(54) MODULAR DEVICE FOR CUTTING COVER CROP RESIDUE

(71) Applicant: The United States of America, as represented by the Secretary of Agriculture, Washington, DC (US)

(72) Inventors: Ted S. Kornecki, Auburn, AL (US); Corey M. Kichler, Auburn, AL (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 81 days.

(21) Appl. No.: 16/149,188

(22) Filed: Oct. 2, 2018

(65) Prior Publication Data

US 2020/0100418 A1 Apr. 2, 2020

(51) Int. Cl.
| | | |
|---|---|---|
| *A01B 63/00* | (2006.01) | |
| *A01B 15/18* | (2006.01) | |
| *A01B 33/02* | (2006.01) | |
| *A01B 33/08* | (2006.01) | |
| *A01B 33/16* | (2006.01) | |

(52) U.S. Cl.
CPC ............ *A01B 63/008* (2013.01); *A01B 15/18* (2013.01); *A01B 33/024* (2013.01); *A01B 33/082* (2013.01); *A01B 33/16* (2013.01)

(58) Field of Classification Search
CPC ..... A01B 15/18; A01B 63/008; A01B 33/024; A01B 33/082
See application file for complete search history.

(56) References Cited

U.S. PATENT DOCUMENTS

| | | | | | |
|---|---|---|---|---|---|
| 4,136,744 | A | * | 1/1979 | Hammett et al. ...... | A01B 21/04 172/105 |
| 4,412,587 | A | * | 11/1983 | van der Lel ......... | A01B 33/021 172/123 |
| 4,655,295 | A | * | 4/1987 | Barnes et al. ......... | A01B 15/18 172/191 |
| 4,724,910 | A | * | 2/1988 | Wheeler .............. | A01B 61/046 172/178 |
| 4,974,683 | A | * | 12/1990 | Hanig et al. ......... | A01B 13/025 111/52 |
| 5,234,060 | A | * | 8/1993 | Carter .................... | A01C 7/205 172/260.5 |
| 8,393,407 | B2 | * | 3/2013 | Freed .................... | A01B 35/16 111/141 |
| 2016/0088786 | A1 | * | 3/2016 | Kornecki et al. ...... | A01C 7/006 111/158 |

* cited by examiner

*Primary Examiner* — Tara Mayo-Pinnock
(74) *Attorney, Agent, or Firm* — John D. Fado; Robert D. Jones

(57) ABSTRACT

The active coulter system includes a pivotable support structure that vertically adjusts the position of an active coulter component to compensate for changes in the contour of a target field. In the preferred embodiment, a proximity sensor and an associated controller are in electronic communication with a linear actuator assembly. Based on data from the proximity sensor, the controller sends electronic instructions to the linear actuator assembly to automatically move the active coulter component vertically. The system also optionally includes a torque/speed sensor that can operate independently to control the torque and/or power supplied to the active coulter component, or the sensor can interface with the controller and anticipate changes in power needs and increase/decrease power before the operation of the active coulter component is affected.

18 Claims, 3 Drawing Sheets

MODULAR DEVICE FOR CUTTING COVER CROP RESIDUE

FIELD OF THE INVENTION

The present invention relates to a system and method for cutting cover crops in a no-till agricultural system. Specifically, the current invention relates to a modular system for cutting a cover crop that has been rolled with a crop roller or otherwise flattened, whereby an automatically adjustable active coulter responds to changes in the contour of a field by (among other things) raising and lowering an active coulter cutting component to ensure that a cover crop on the surface of the field is cut, and a seed drill/planter can plant seeds in the soil below the surface crop residue.

BACKGROUND OF THE INVENTION

In last two decades, the use of cover crops in no-till farming systems has steadily increased. For the purpose of this disclosure, the term "cover crops" is defined as crops that are intentionally allowed to remain in a field as a means of improving growing conditions in the field. Cover crops include crops that are grown for the sole purpose of enhancing growing conditions in anticipation of a subsequently-planted cash crop, as well as crop stalks and residue that remain in a field after a cash crop harvest. Cover crops protect the soil from (among other things) erosion, runoff, soil compaction, and weed pressure. Cover crops also help conserve soil moisture and significantly contribute to soil nutrients.

However, the growth and termination of cover crops must be properly managed to realize these benefits. To plant a subsequent cash crop, a seed drill or other planting mechanism must penetrate the cover crop biomass and deposit a seed into the soil below the cover crop. For smaller scale farms with lighter tractors, the cover crop biomass can cause significant problems, including the "hairpinning" of crop residue into the furrow (instead of completely cutting/slicing through the residue).

The need exists for a means of cutting thick cover crop biomass mats so that seeds can be effectively and efficiently planted at the correct depth in the soil below a biomass mat. The system described herein comprises an active coulter apparatus with depth and torque control so that a seed drill can deposit seeds at the optimum depth.

SUMMARY OF THE INVENTION

This disclosure is directed to an active coulter system comprising at least one pivotable support structure attached to an active coulter component. In the preferred embodiment, the pivotable support structure comprises at least one L-shaped plate. A linear actuator is operatively connected to an upper portion of a vertical leg of the L-shaped plate. A pivot joint is located on a horizontal base of the L-shaped plate, and an active coulter component is positioned at a vertex of the L-shaped plate so that the pivotable support structure supports and moves the active coulter component. The active coulter system is configured so that as the active coulter system is moved across a field, the linear actuator assembly extends and contracts so that the pivotable support structure pivots on the pivot joint. When the pivotable support structure is pivoted, the active coulter component is raised and lowered—thereby cutting biomass and changing a depth of a furrow created by the active coulter component.

DETAILED DESCRIPTION OF PREFERRED EMBODIMENTS

Figure 1:
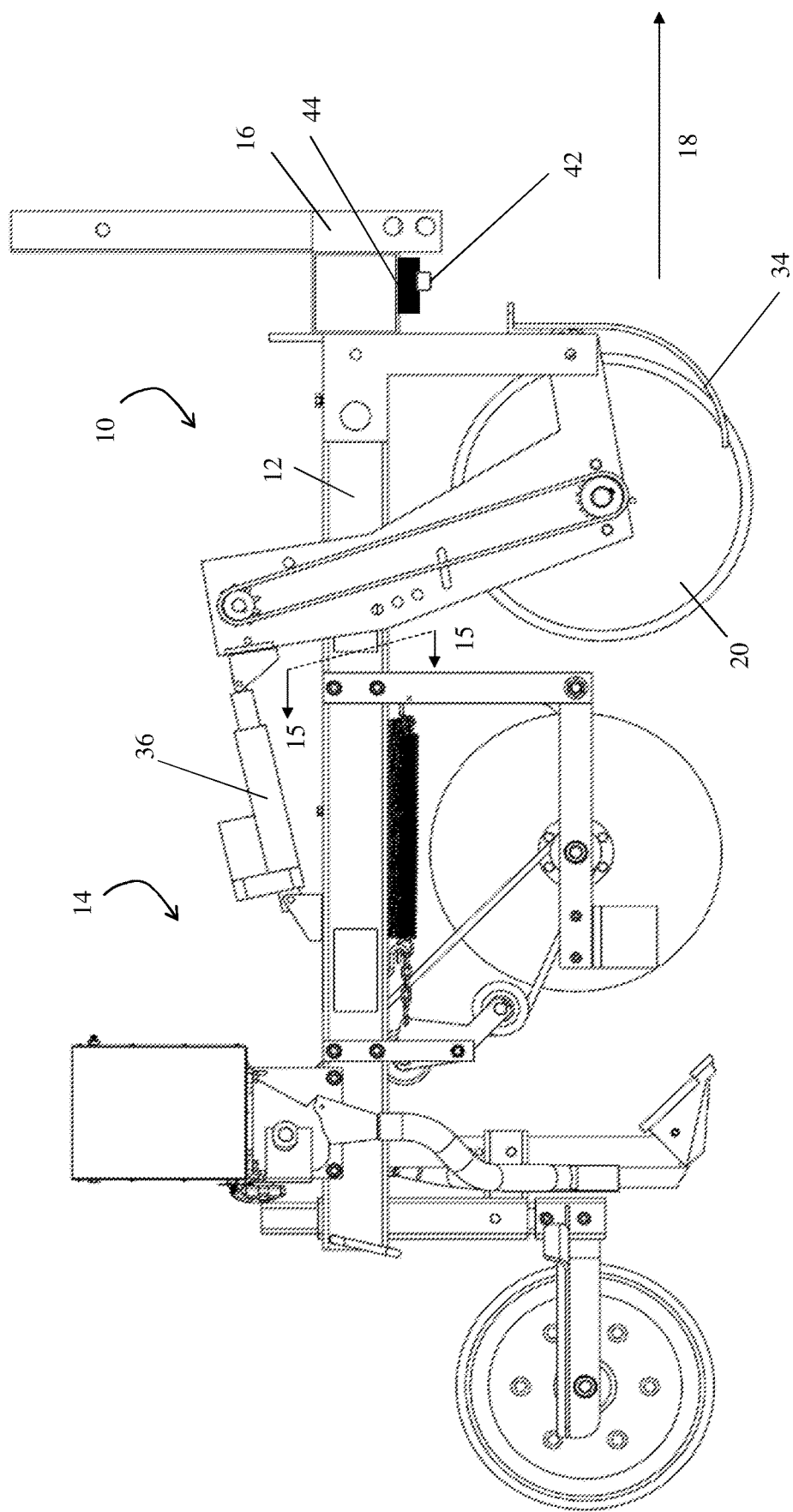
FIG. 1 is a profile view of a modular active coulter system connected to a conventional seed drill.

As generally shown in FIG. 1, in the preferred embodiment, the modular active coulter system 10 is positioned on a horizontal structural carrier beam 12. In addition to the modular active coulter system 10, a conventional seed drill and planting assembly 14 are also positioned on the carrier beam 12. For the purposes of this disclosure, a "conventional seed drill and planting system" 14 is defined as a seed drill and planting system having the components generally shown in FIG. 1, reference 14 as of the date of the filing of this disclosure. More specifically, the components to the left of section line 15 in FIG. 1 (except the linear actuator 36). One of ordinary skill understands a conventional seed drill and planting system.

The carrier beam 12 is operatively connected to a horizontal portion of a conventional three-point tractor hitch 16, or a similar towing structure. The active coulter system 10 described herein is modular so that the system 10 can easily be retrofitted on essentially any sufficiently sized horizontal carrier beam 12. In operation (with reference to FIG. 1), as a tractor moves across a field in the direction of the arrow 18, the active coulter component 20 of the active coulter system 10 cuts the cover crop so that the seed drill and cutting assembly 14 can successfully plant a seed.

Figure 2:
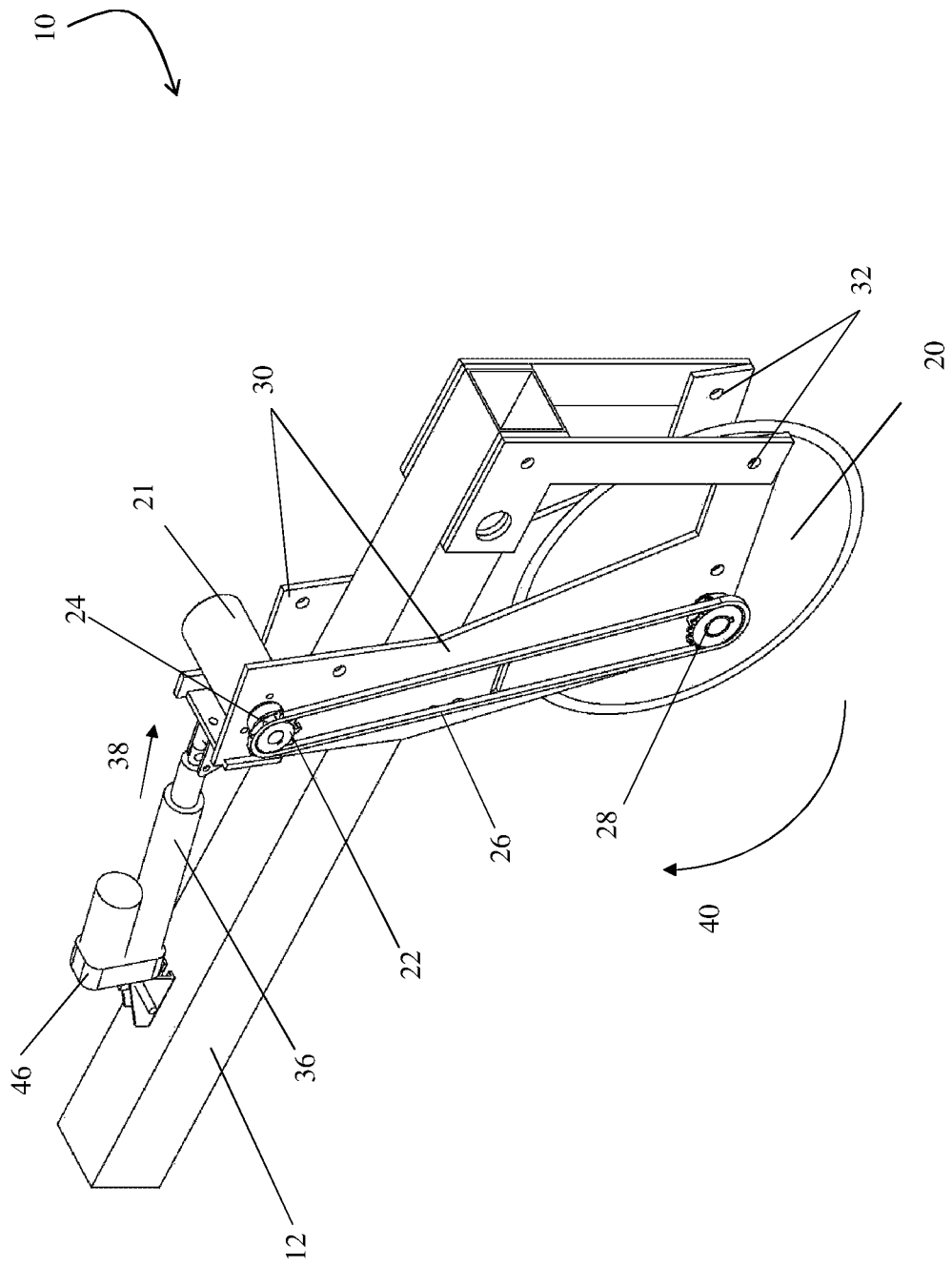
FIG. 2 is a more detailed elevational perspective view of the modular active coulter system, as isolated from the seed drill and planting system, and from the structural tractor connection/hitch members shown in FIG. 1.
Figure 3:
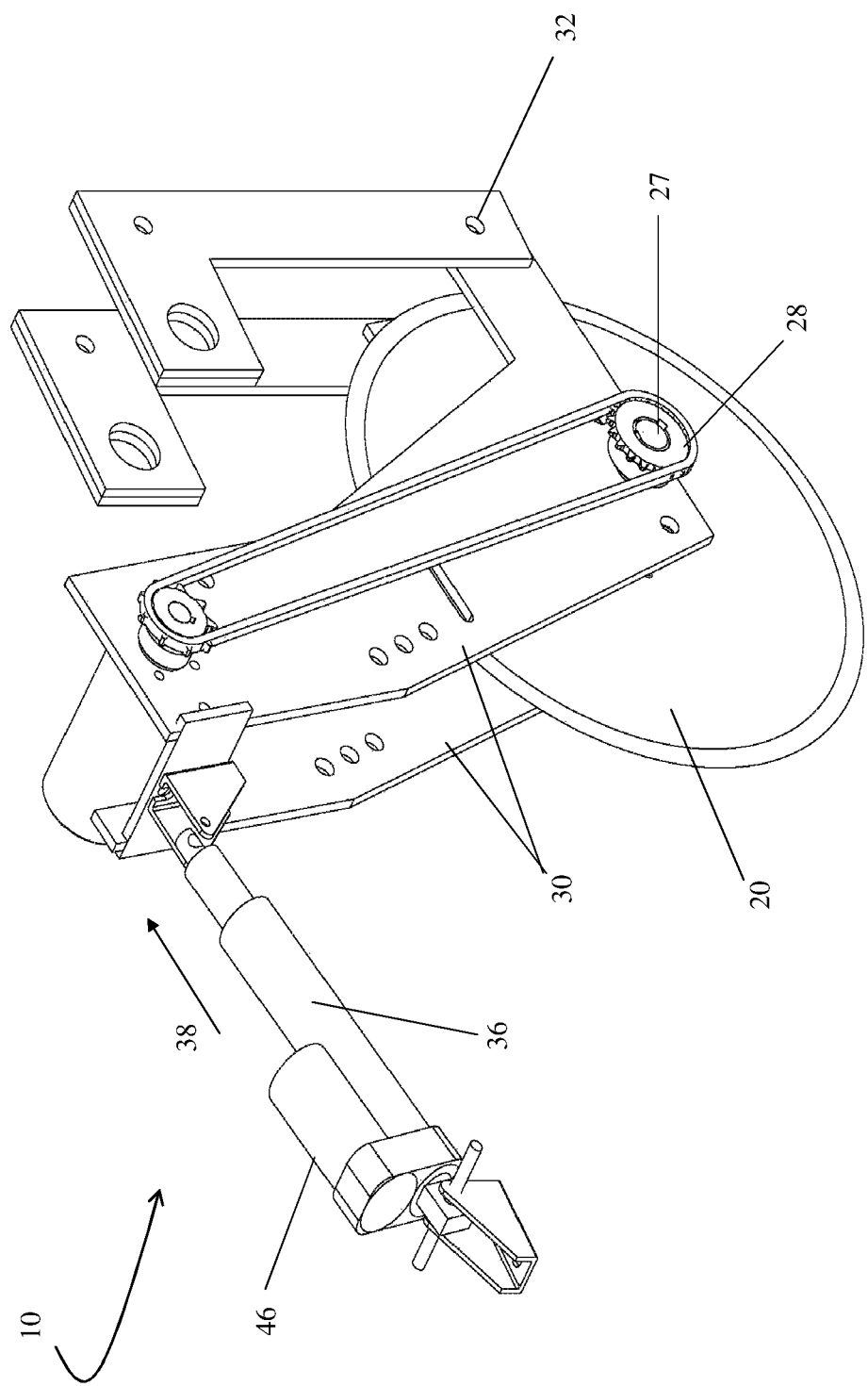
FIG. 3 is an elevational perspective view of the modular active coulter system as shown in FIG. 2—but with the horizontal carrier beam removed so that the other system components are more clearly visible.

For the purposes of this disclosure, an "active coulter component" 20 is defined as a component of the modular active coulter system 10, as shown in FIGS. 1-3. The active coulter component 20 is directly driven by an active external mechanical power means 21, like a hydraulic motor, a tractor power take-off, an electric motor, or the like. By contrast, a "passive coulter component" is not driven by an external mechanical power means 21. A passive coulter component is passively rotated through contact with the ground as a tractor tows a passive coulter implement across a field.

FIG. 2 shows the modular active coulter system 10 in greater detail. The active coulter system 10 comprises an external mechanical power means 21 that powers the active coulter component 20. In the preferred embodiment, a hydraulic motor assembly 21 and an associated drive sprocket 22 power the active coulter component 20 via a drive chain 26. The hydraulic motor assembly 21 and driving sprocket 22 are positioned near an upper portion of a pivotable support structure 30. A linear actuator assembly 36 is also positioned near an upper portion of the pivotable support structure 30. In the preferred embodiment, the linear actuator comprises a hydraulic cylinder controlled by electronic controls.

In the preferred embodiment, the pivotable support structure 30 comprises at least one L-shaped plate, but other configurations are possible. The driven sprocket 28 and active coulter component 20 are positioned on a pivotable support structure 30, preferably at a vertex of the pivotable support structure 30. A pivot joint 32 is preferably located near the end of a horizontal base of the pivotable support 30. In operation, the pivotable support 30 pivots/hinges on the pivot joint 32. Residue flaps 34 are positioned on the sides of the active coulter component 20 to help pin the cover crop/biomass residue against the ground so that the active coulter component 20 cuts the cover crop cleanly.

FIG. 3 shows the FIG. 2 components with the carrier beam 12 removed so that the pivotable support structure 30 is more clearly visible. As shown in FIGS. 2 and 3, in the preferred embodiment, the pivotable support structure 30 comprises two parallel pivotable plates. The two pivotable structural support plates 30 form a "fork" configuration in which each of the two pivotable support plates 30 frame the active coulter component 20. As shown in FIG. 3, the driven sprocket 28 drives an axle 27 that bisects the vertex of the support plates 30 and drives the active coulter component 20. As shown in FIGS. 2 and 3, the two pivotable support plates 30 also straddle/frame the carrier beam 12. This structure enables the active coulter component 20 to be vertically adjusted quickly and efficiently.

In alternative embodiments, the active coulter component 20 may be powered by other types of external mechanical power means 21, such as tractor power take-off, or other types of motors such as an electric motor or an independent conventional internal combustion engine. In some alternative embodiments, the vertical position of the active coulter component 20 is manually controlled by setting the position/depth of the active coulter component 20 before an operation begins, and leaving the position unchanged. In some embodiments, a hand-cranked screw drive or a similar manual mechanism sets the position of the active coulter. Power may be transferred from the external power means 21 to the active coulter component 20 via a belt and pulley assembly, a shaft drive assembly, or by any means known in the art.

As shown in FIG. 2, the active coulter system 10 further comprises an automated means of modulating the furrow depth created by the system 10. The system 10 cutting depth is primarily controlled by the linear actuator assembly 36. In operation, to raise the active coulter component 20, the linear actuator 36 extends in the direction of the arrow 38, and the pivotable support structure 30 pivots about the pivot joint 32 so that the active coulter (cutting) component 20 moves in an upward arc in the direction of the arrow 40. To lower the active coulter component 20, the linear actuator 36 contracts and the pivotable support structure 30 pivots downwardly, thereby lowering the active coulter component 20.

In the preferred embodiment, the modular active coulter system 10 includes a means of automatically increasing and decreasing the depth of the active coulter component 20. In accordance with this embodiment, the active coulter system 10 comprises a proximity sensor 42 and an associated controller 44 (see FIG. 1). The proximity sensor 42 senses horizontal speed and effectively measures the distance between the sensor 42 and the ground, and then communicates the data to the controller 44. The controller 44 processes the data and electronically communicates control instructions to a control mechanism 46 (such as a solenoid, servo, or other control mechanism based on the type of linear actuator 36) attached to the linear actuator 36. The linear actuator 36 then raises and lowers the active coulter component 20 (as described above) in response to changes in the topography of the field.

The modular active coulter system 10 further includes a means of automatically modulating the torque/rotational speed of the active coulter component 20. The hydraulic motor assembly 21 (or other external mechanical power means) includes a torque sensor 24 that is in communication with the hydraulic motor assembly 21. In operation, when the torque sensor 24 senses a decrease in the rotational speed of the of the active coulter component 20, then the power provided by the hydraulic motor 21 and drive sprocket 22 is automatically increased.

In one alternative embodiment, the speed of the active coulter component 20 remains relatively consistent, but the torque transferred to the drive sprocket is increased by centrifugal or conventional gearing/transmission. In a further alternative embodiment, the proximity sensor 42 and the controller 44 may be in electrical communication with the hydraulic motor assembly 21, so that when the active coulter component 20 moves downwardly, the controller 44 anticipates the increased need for torque/power, and increases the torque/power output by the hydraulic motor 21 and drive sprocket 22.

For the foregoing reasons, it is clear that system described herein provides an innovative modular active coulter system 10 that may be used in agricultural planting operations. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. An active coulter system comprising a pair of pivotable support plates that frame an active coulter component so that as a linear actuator extends and contracts, the pivotable support plates raise and lower the active coulter component, wherein the pivotable support plates have an L-shape, so that the linear actuator is positioned near a top of a vertical leg of the L-shaped pivotable support plates, the pivotable support plates pivot on a pivot joint near an end of a horizontal leg of the L-shaped pivotable support plates, and the active coulter component is driven by an axle that bisects the vertex of the L-shaped pivotable support plates.

2. The active coulter system of claim 1 further comprising a proximity sensor and an associated controller, wherein the linear actuator is in electronic communication with the controller so that the linear actuator raises and lowers the active coulter component in response to electronic instructions from the controller.

3. An active coulter system comprising:
   at least one pivotable support structure;
   a linear actuator assembly operatively connected to the pivotable support structure;
   a pivot joint located on the pivotable support structure; and,
   an active coulter component that is positioned so that the pivotable support structure supports and moves the active coulter component, the active coulter component comprising a coulter that is actively rotated by an external mechanically powered means;
   wherein, the active coulter system is configured so that as the active coulter system is moved across a field, the linear actuator assembly extends and contracts so that the pivotable support structure pivots on the pivot joint, and the active coulter component is raised and lowered thereby cutting biomass and changing a depth of a furrow created by the active coulter component.

4. The system of claim 3 wherein the pivotable support structure comprises at least one L-shaped support plate.

5. The system of claim 4 wherein the linear actuator assembly is connected to a vertical leg of the L-shaped support plate.

6. The system of claim 4 wherein the pivot joint bisects a horizontal base leg of the L-shaped support plate.

7. The system of claim 4 wherein the active coulter is positioned adjacent to a vertex of the L-shaped support plate.

8. The system of claim 4 wherein the external mechanical power means comprises a motor that is positioned adjacent to a top of a vertical leg of the L-shaped support plate, the external mechanical means rotating the active coulter component.

9. The system of claim 8 wherein the external mechanical power means comprises a hydraulic motor.

10. The system of claim 9 wherein the hydraulic motor further comprises a driving sprocket, a chain, and a driven sprocket, the driven sprocket driving the active coulter component.

11. The system of claim 3 wherein the system further comprises one or both of a torque or speed sensor, the system being configured so that if the system senses a need for torque or a decrease in active coulter component speed, power to the active coulter component is increased.

12. The system of claim 3 wherein the system further comprises a proximity sensor and an associated controller, the proximity sensor and associated controller sensing at least a horizontal speed and a distance to a ground.

13. The system of claim 12 wherein the system is structured so that the controller communicates electronic instructions to the linear actuator assembly, wherein the linear actuator assembly causes the active coulter component to move vertically and thereby create a furrow for planting a seed at a target depth.

14. The system of claim 12 wherein the controller is in electrical communication with one or both of an electronic torque or speed sensor, wherein the system is configured so that the controller anticipates an increased or decreased need for torque or rotational speed based on a vertical movement of the active coulter component, and the controller responds by increasing or decreasing power to the active coulter based on the anticipated need.

15. The system of claim 3 wherein the linear actuator comprises a hydraulic cylinder.

16. The system of claim 3 wherein that the at least one pivotable support structure comprises two pivotable support plates, so that the two pivotable support plates frame the active coulter component and the active coulter component rotates between the two pivotable support plates.

17. The system of claim 16 wherein the two pivotable support plates also frame a carrier beam that supports a conventional planter.

18. A method of planting a seed below a biomass mat, the method comprising the steps of:
   (a) providing the system of claim 3;
   (b) positioning the system on a horizontal carrier beam ahead of a conventional seed drill and planting system;
   (c) moving the system across a field so that after the active coulter component cuts the biomass mat and creates a furrow in the field, the conventional seed drill and planting system deposits a seed in the furrow and covers it up.

* * * * *